(12) United States Patent
Seto et al.

(10) Patent No.: US 7,424,154 B2
(45) Date of Patent: Sep. 9, 2008

(54) BOXED AND LINED INPUT PANEL

(75) Inventors: Tetsuo Seto, Bellevue, WA (US);
Takanobu Murayama, Seattle, WA (US)

(73) Assignee: Microsoft Corporation, Seattle, WA (US)

( * ) Notice: Subject to any disclaimer, the term of this patent is extended or adjusted under 35 U.S.C. 154(b) by 690 days.

(21) Appl. No.: 10/704,121

(22) Filed: Nov. 10, 2003

(65) Prior Publication Data
US 2005/0102620 A1    May 12, 2005

(51) Int. Cl.
*G06K 9/00* (2006.01)
(52) U.S. Cl. ............................ 382/181; 382/313; 704/8
(58) Field of Classification Search .......... 382/181–189
See application file for complete search history.

(56) References Cited

U.S. PATENT DOCUMENTS

| | | | |
|---|---|---|---|
| 5,392,400 | A | 2/1995 | Berkowitz et al. |
| 5,421,004 | A | 5/1995 | Carpenter et al. |
| 5,544,316 | A | 8/1996 | Carpenter et al. |
| 5,551,030 | A | 8/1996 | Linden et al. |
| 5,596,702 | A | 1/1997 | Stucka et al. |
| 5,708,764 | A | 1/1998 | Borrel et al. |
| 5,880,733 | A | 3/1999 | Horvitz et al. |
| 6,016,145 | A | 1/2000 | Horvitz et al. |
| 6,023,275 | A | 2/2000 | Horvitz et al. |
| 6,356,866 | B1 | 3/2002 | Pratley et al. |
| 6,415,258 | B1 | 7/2002 | Reynar et al. |
| 6,424,743 | B1 | 7/2002 | Ebrahimi |
| 6,446,041 | B1 | 9/2002 | Reynar et al. |
| 6,538,187 | B2 | 3/2003 | Beigi |
| 6,567,549 | B1 | 5/2003 | Marianetti, II et al. |
| 7,102,628 | B2 * | 9/2006 | LeKuch et al. .............. 345/182 |

(Continued)

FOREIGN PATENT DOCUMENTS

EP    1349056 A2    10/2003

(Continued)

OTHER PUBLICATIONS

Steve Smithies et al., "Equation entry and editing via handwriting and gesture recognition", Behavior & Information Technology, vol. 20, No. 1, pp. 53-67, 2001.

(Continued)

*Primary Examiner*—Tom Y Lu
(74) *Attorney, Agent, or Firm*—Birch, Stewart, Kolasch & Birch, LLP

(57) ABSTRACT

A method and apparatus for receiving strokes of electronic ink in more than one language is provided. An input device is used to enter at least one stroke of electronic ink into a processing device. The processing device stores a language indication associated with the electronic ink, such that the language indication provides a way to associate a handwriting recognizer with the ink. The user may change the language or recognizer associated with the ink by flipping over a pen and using another tip of the pen or may use another pen or other input device. Aspects of the described system and method accommodate various optional interfaces to associate a pen tip or click of a button to one or more languages. Other aspects of the system and method include language switching of a displayed software keyboard when a pen input device is within a predetermined distance from a display.

13 Claims, 21 Drawing Sheets

U.S. PATENT DOCUMENTS

| | | | |
|---|---|---|---|
| 7,206,737 B2 * | 4/2007 | Seto | 704/8 |
| 2002/0169999 A1 | 11/2002 | Bhansali et al. | |
| 2003/0009540 A1 | 1/2003 | Benfield et al. | |
| 2003/0016876 A1 | 1/2003 | Nagel et al. | |
| 2003/0041167 A1 | 2/2003 | French et al. | |
| 2003/0041238 A1 | 2/2003 | French et al. | |

FOREIGN PATENT DOCUMENTS

| | | |
|---|---|---|
| JP | 11-015918 | 1/1999 |

OTHER PUBLICATIONS

Toshiyuki Masui, "An Efficient Text Input Method for Pen-based Computers", Proceedings of the ACM Conference on Human Factors in Computing Systems, ACM press, pp. 328-335, (CHI '98) (Apr. 1998).

James A. Pittman, "Recognizing Handwritten Text", ACM 0-89791-383-3/91.

Jayashree Subrahmonia et al., "Pen Computing: Challenges and Applications", Proceedings of the International Conference on Patter Recognition, (ICPR '00) IEEE, 2000.

James A. Pittman, "Recognizing Handwritten Text", pp. 271-275, ACM 1991.

Takeo Igarashi et al., "An Architecture for Pen based Interaction on Electronic Whiteboards", pp. 68-75, ACM 2001.

Sharon Oviatt, "Ten Myths of Multimodal Interaction", Communications of the ACM, vol. 42, No. 11, pp. 74-81, Nov. 1999.

Sharon Oviatt, "Taming Recognition Errors with a Multimodal Interface", Communications of the ACM, vol. 43, No. 9, pp. 45-51, Sep. 2000.

* cited by examiner

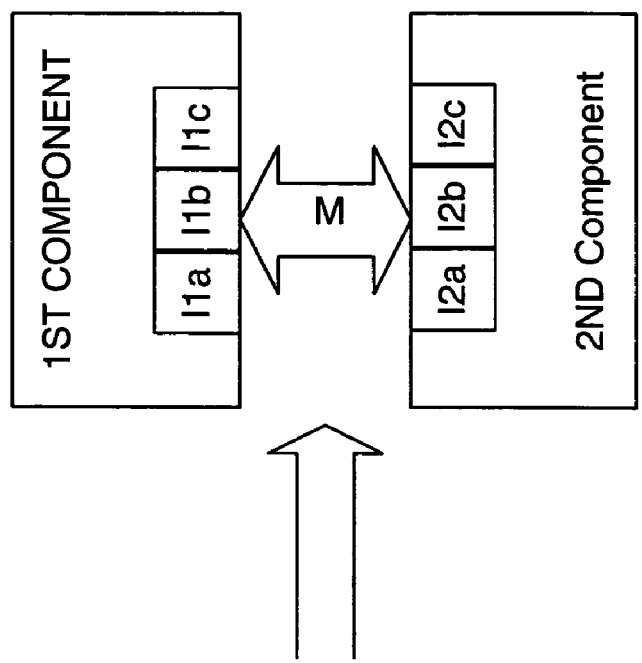
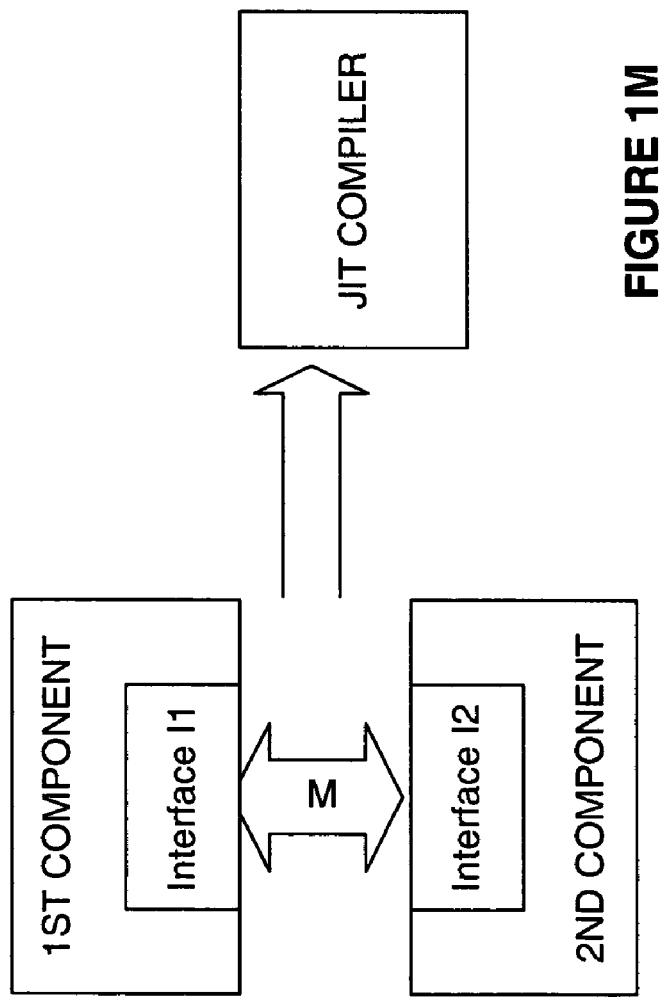
FIGURE 1M

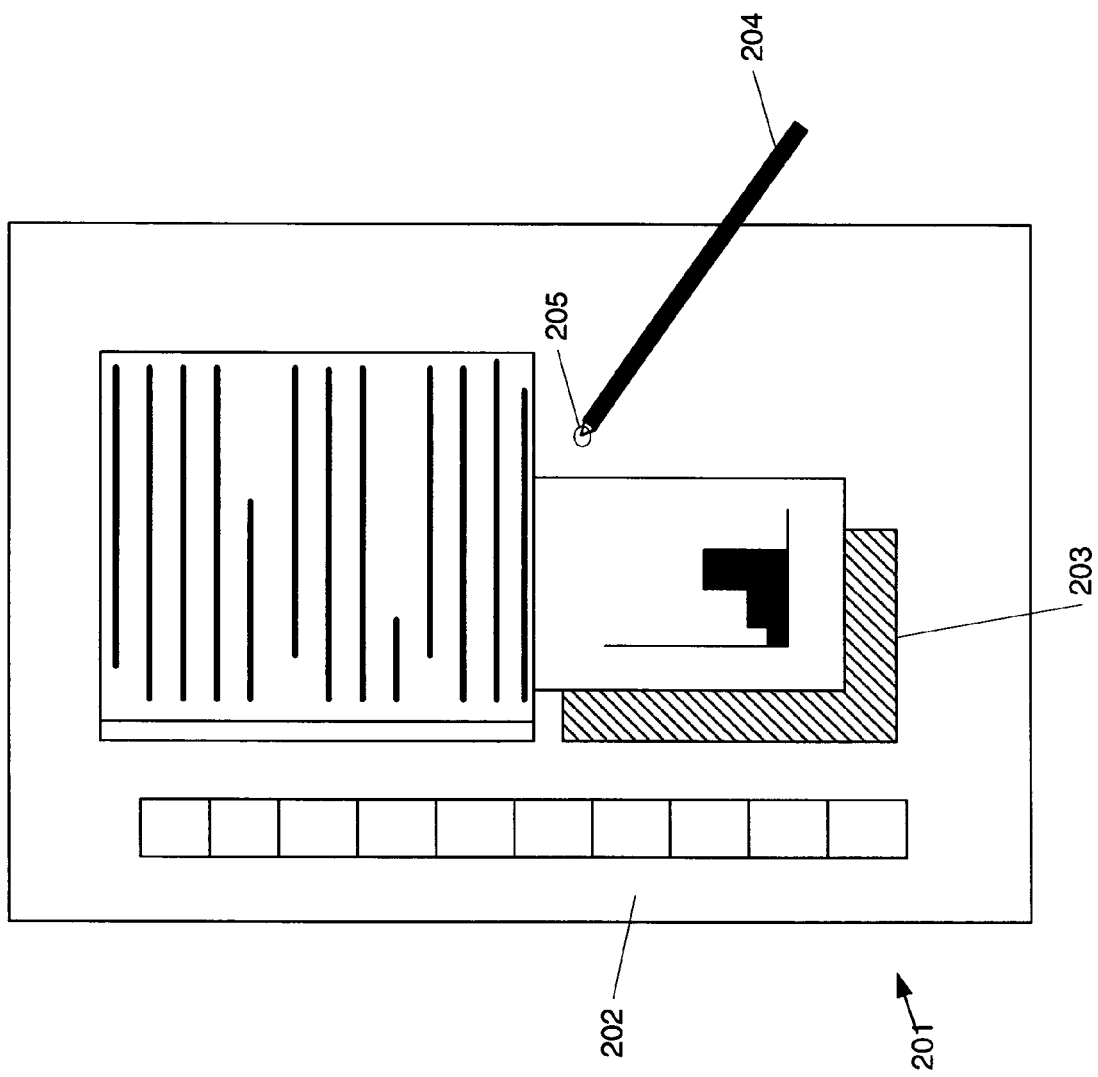

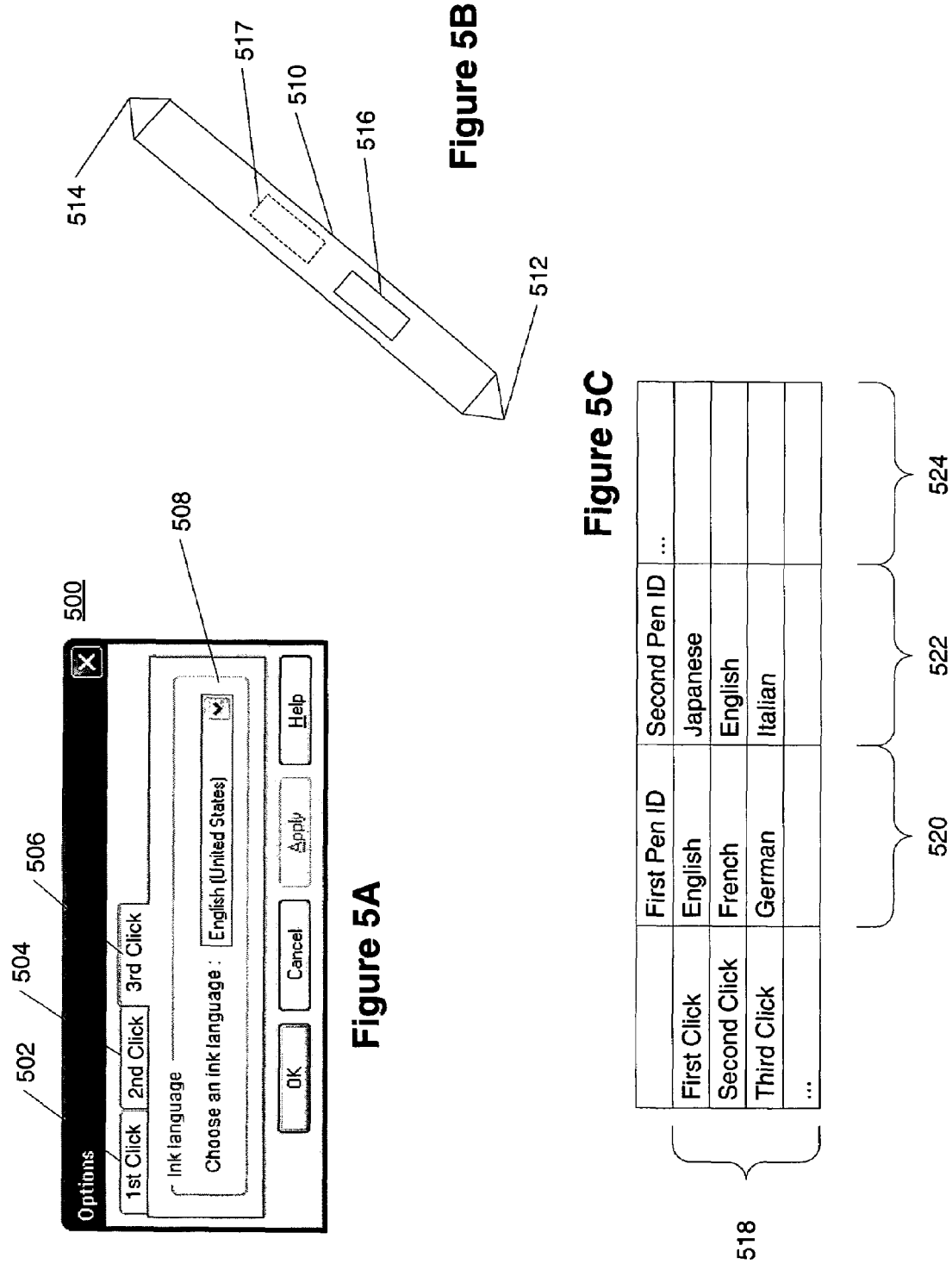

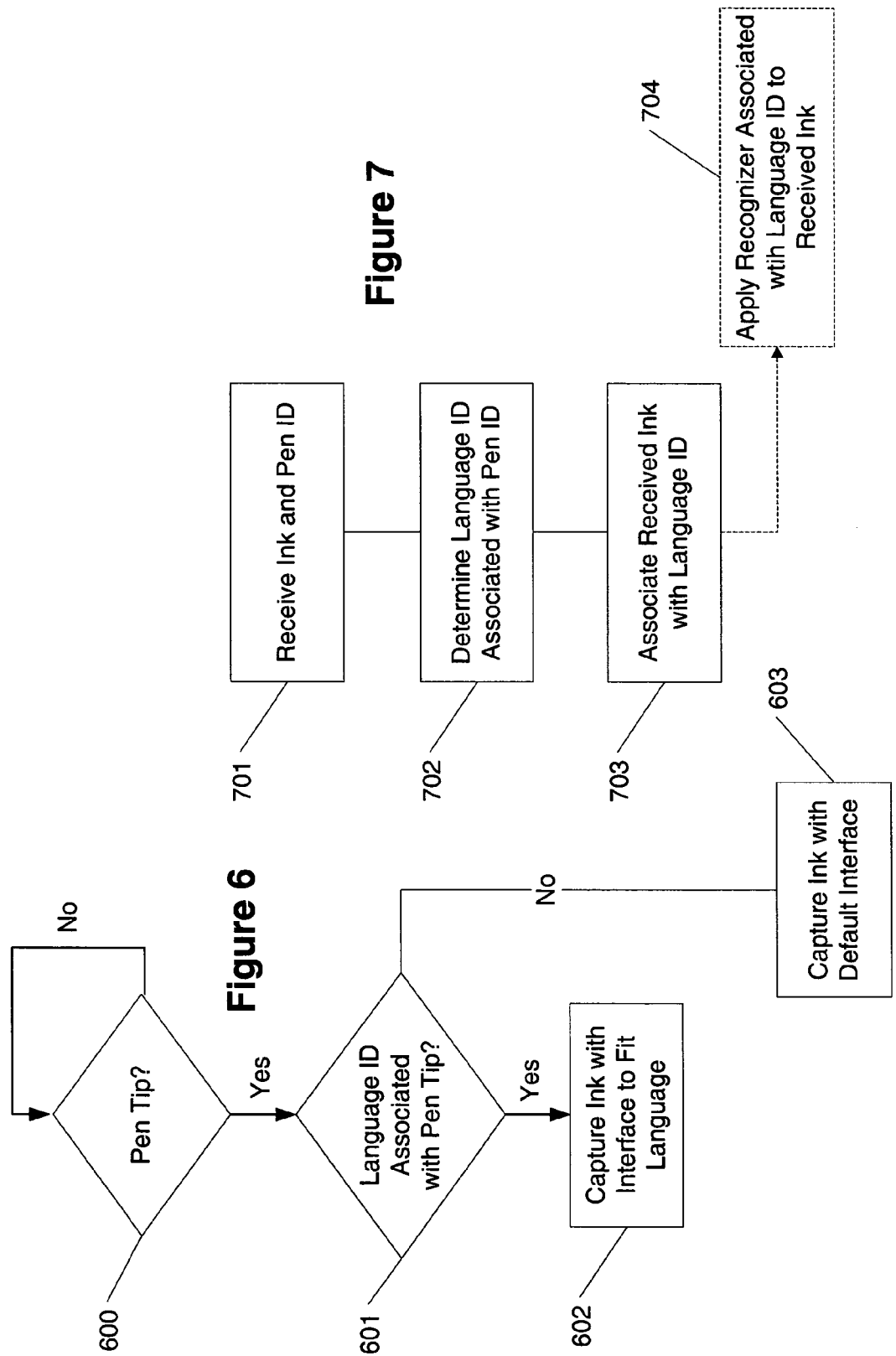

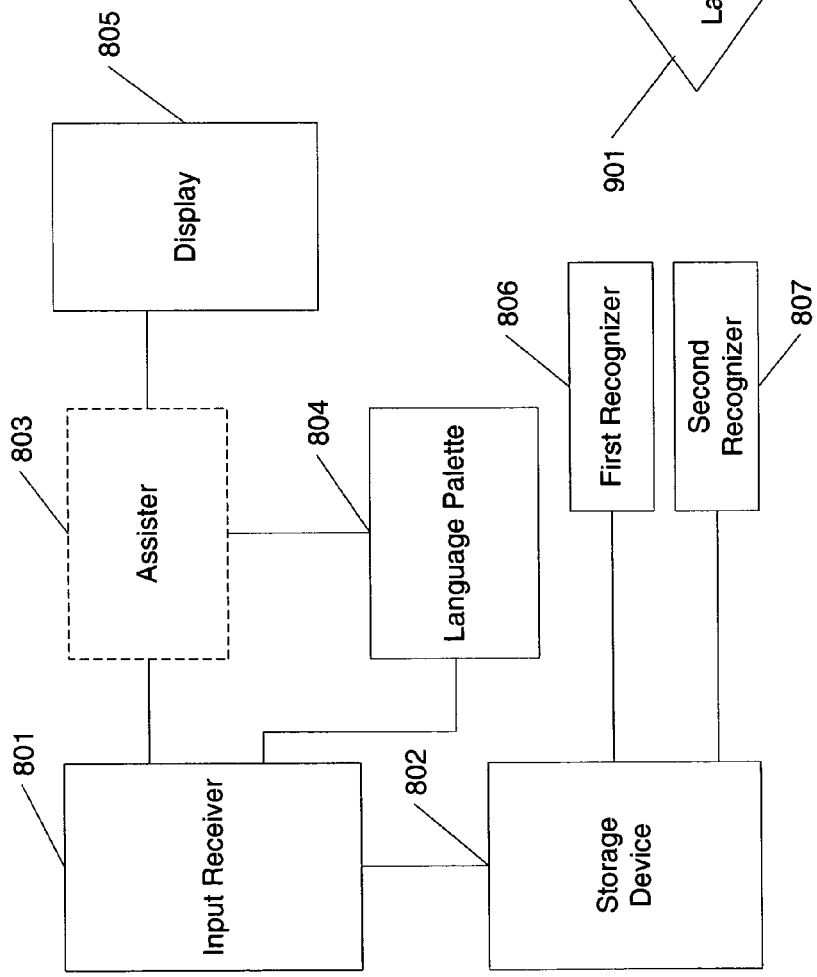
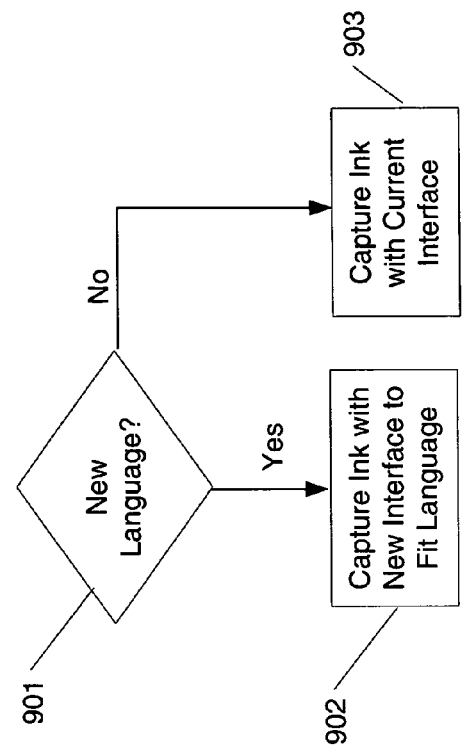
Figure 8
Figure 9

日本と united States
{ 2002

Japan and United States of America

日本と United States of America

BOXED AND LINED INPUT PANEL

BACKGROUND OF THE INVENTION

1. Field of the Invention

Aspects of the invention relate to a method and an apparatus for recognizing handwritten information written in various languages. More particularly, aspects of the invention allow a user to easily enter handwritten information in various languages, and having the handwritten information associated with a language for recognition purposes.

2. Description of Related Art

People often rely on graphical representations more than textual representations of information. They would rather look at a picture than a block of text that may be equivalent to the picture. For instance, a home owner may cut out pictures from magazines to show contractors exactly what is desired when remodeling a kitchen or bathroom. Textual descriptions of the same material often fall short. The tool that the home owner may use is no more complex than a pair of scissors.

In the computing world, however, attempting to capture and convey the identical content is cumbersome. Typical computer systems do not provide an easy interface for capturing and conveying graphically intensive content. Rather, they are optimized for capturing and rendering text. For instance, typical computer systems, especially computer systems using graphical user interface (GUI) systems, such as Microsoft WINDOWS, are optimized for accepting user input from one or more discrete input devices such as a keyboard for entering text, and a pointing device such as a mouse with one or more buttons for driving the user interface.

Handwritten information received into a computer may be used in a variety of ways. For example, the handwritten information may remain as only handwritten information. Also, the handwritten information may be processed by a handwriting recognition engine and the information replaced by text from the handwriting recognition engine. Finally, the handwritten information may remain displayed to a user and the results of the handwriting recognition engine associated with the handwritten information (being displayed in conjunction with the handwriting information or hidden from the user, but still being associated with the handwriting information).

A variety of handwritten information recognizers exist (English, French, German, and the like). After selecting a default language (and associated handwritten information recognizer), a user may write in the default language and have the handwritten information processed by a default recognizer to return text in the default language. While this approach is fine for most uses, a significant portion of the world speaks more than one language. In these situations, users may be writing in a first language yet find some concepts more easily expressed in a second language. A resulting line of handwritten notes may have some words in the first language, some words in the second language, and yet more words in the first language. While the user may easily be able to discern what concepts he was writing at the time, the recognition engine may have a significantly more difficult time. Thus, the user who wishes the freedom to express concepts in a variety of languages is at a disadvantage. Further, the input environment should be conducive to writing in various languages. A better solution is needed.

BRIEF SUMMARY

Aspects of the present invention relate to easily modifying which handwriting recognizer is associated with handwritten ink, thereby solving one or more problems described above.

In some aspects of the present invention, a user interface may be modified to accommodate ink relating to a type of language (symbolic and non-symbolic). For symbolic languages, a boxed or segmented user interface may be used. For non-symbolic languages a writing line or lines may be used. Both interfaces may be used in combination on the same writing area, thereby making possible recognition of ink one language that has been written next to ink in another language.

These and other aspects are addressed in relation to the Figures and related description.

BRIEF DESCRIPTION OF THE DRAWINGS

The present invention is illustrated by way of example and not limited in the accompanying figures in which like reference numerals indicate similar elements and in which:

FIG. 2 shows a display for a stylus-based input system according to aspects of the present invention.

FIGS. 5A, 5B, and 5C illustrate a second embodiment of a language palette, a pen, and cyclical language associations in accordance with aspects of the present invention.

FIG. 6 represents a process of adjusting a user interface to comport with a language in accordance embodiments of the invention.

FIG. 7 shows a process for associating a language or a recognizer with received handwritten ink in accordance with embodiments of the invention.

FIG. 8 represents a sample set of relationships between components in accordance with embodiments of the invention.

FIG. 9 shows a process of modifying a user interface when a new language is used in accordance with embodiments of the invention.

FIGS. 11-15 and 19-20 show various combinations of boxed and lined input regions in accordance with aspects of the present invention.

FIGS. 21 and 22 show hand written ink without boxed input in accordance with aspects of the present invention.

DETAILED DESCRIPTION OF THE DRAWINGS

Figure 1:
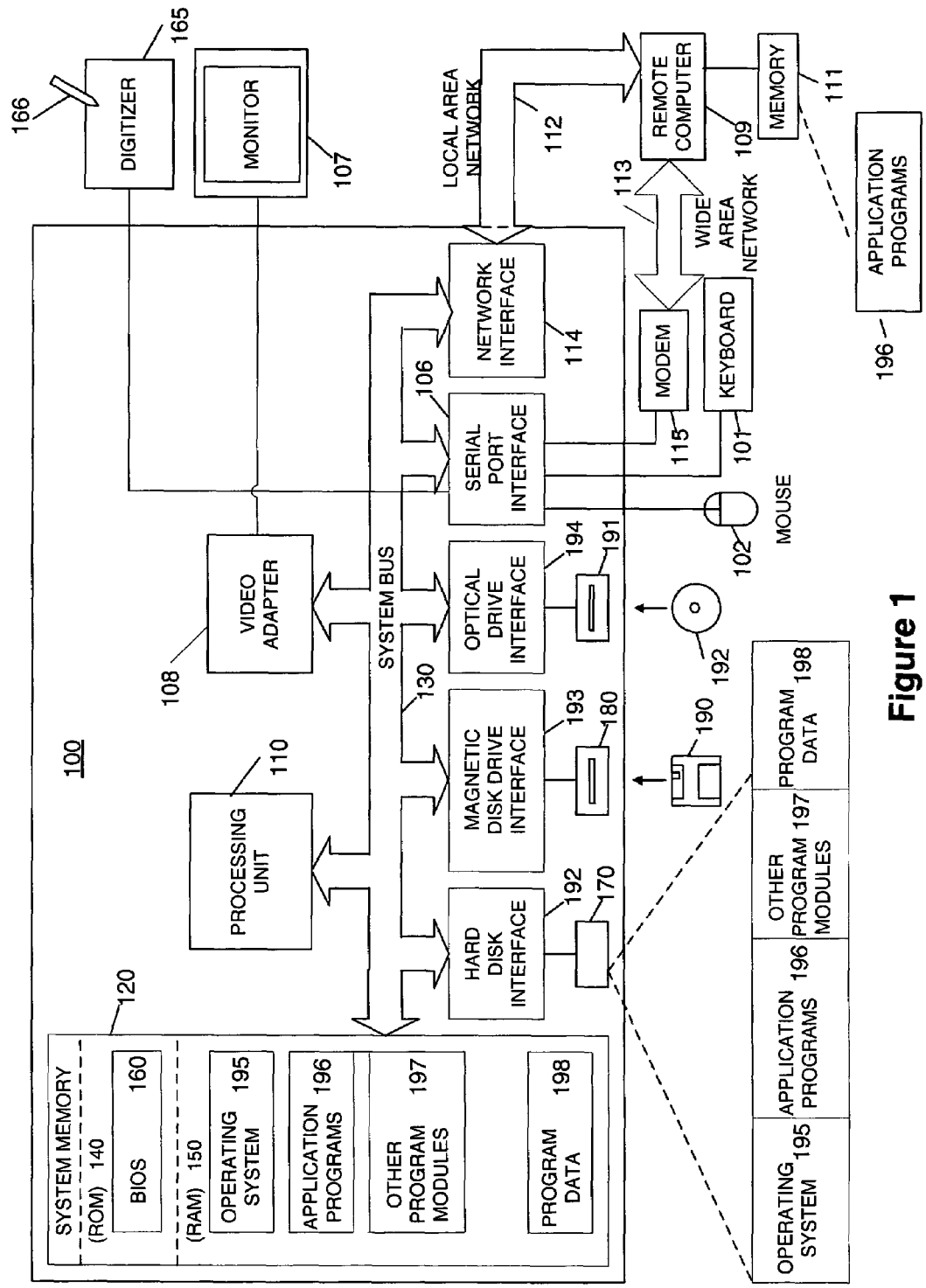
FIGS. 1 through 1M shows a general-purpose computer supporting one or more aspects of the present invention.

Aspects of the present invention relate to providing a user interface that allows switching between user input modes to enable better multi-language support for recognition and other purposes.

The following is arranged into a number of subsections to assist the reader in understanding the various aspects of the invention. The subsections include: terms; general-purpose computer; pen tip associations, button associations; language assistance; illustrative processes; user interfaces; and user interface selection processes.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence of strokes, where each stroke is comprised of a sequence of points. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink), among other information.

Terms

Ink—A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level.

Ink object—A data structure storing ink with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

General-Purpose Computing Environment

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In one embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device. Further, the system may include wired and/or wireless capabilities. For example, network interface 114 may include Bluetooth, SWLan, and/or IEEE 802.11 class of combination abilities. It is appreciated that other wireless communication protocols may be used in conjunction with these protocols or in place of these protocols.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
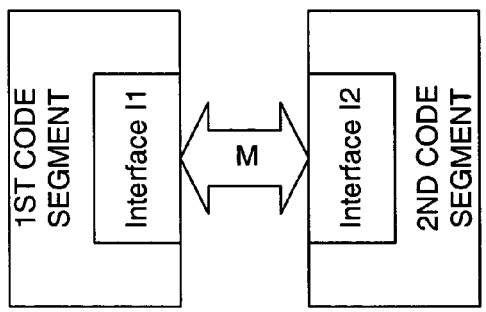
Figure 1E:
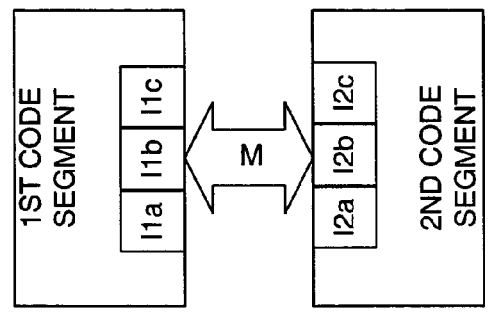
Figure 1B:
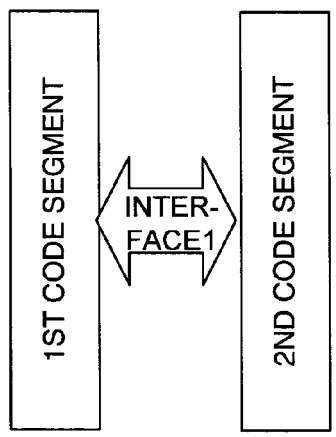

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
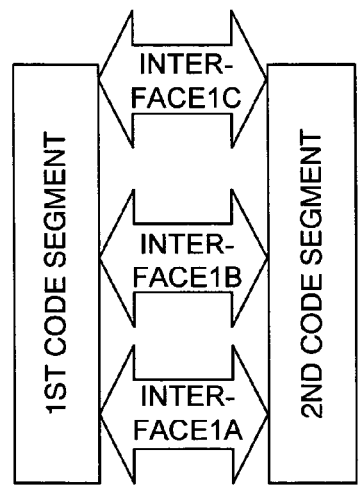

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface 1 may be subdivided to convert the communications of the interface into multiple interfaces Interface 1A, Interface 1B, Interface 1C, etc. while achieving the same result. As illustrated in FIG. 1E, the function provided by interface I1 may be subdivided into multiple interfaces I1a, I1b, I1c, etc. while achieving the same result. Similarly, interface I2 of the second code segment which receives information from the first code segment may be factored into multiple interfaces I2a, I2b, I2c, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
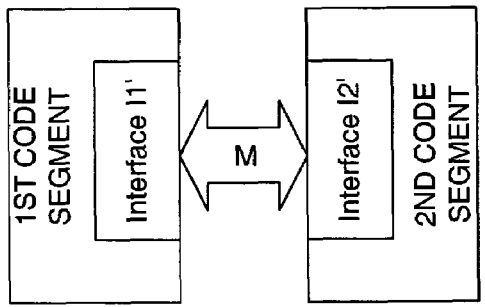
Figure 1G:
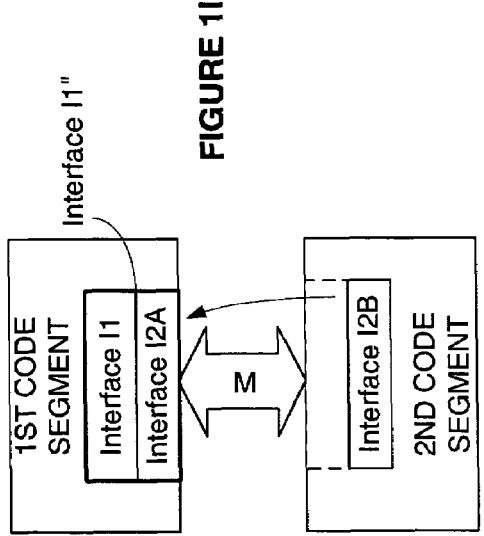

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment., If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
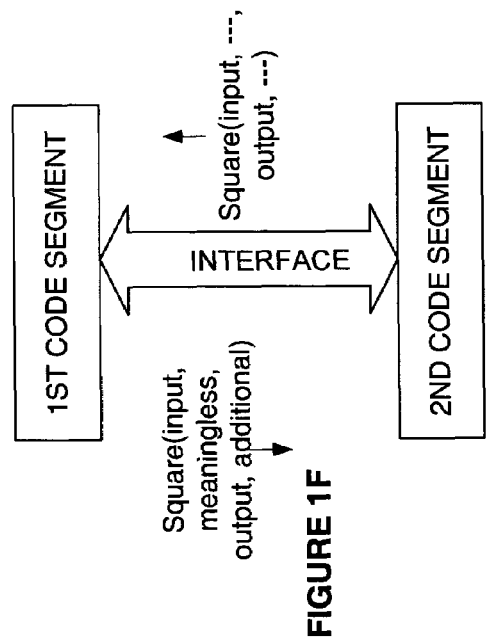
Figure 1I:
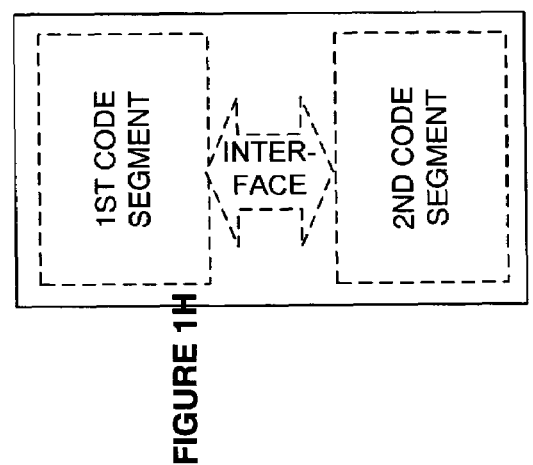

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface 1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
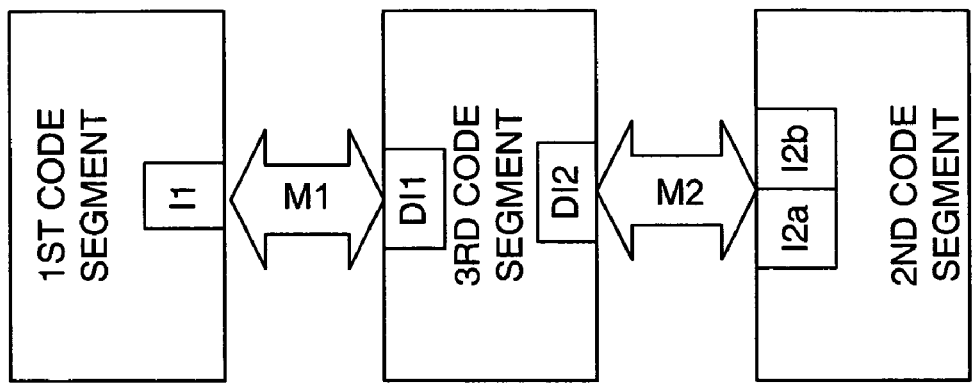
Figure 1J:
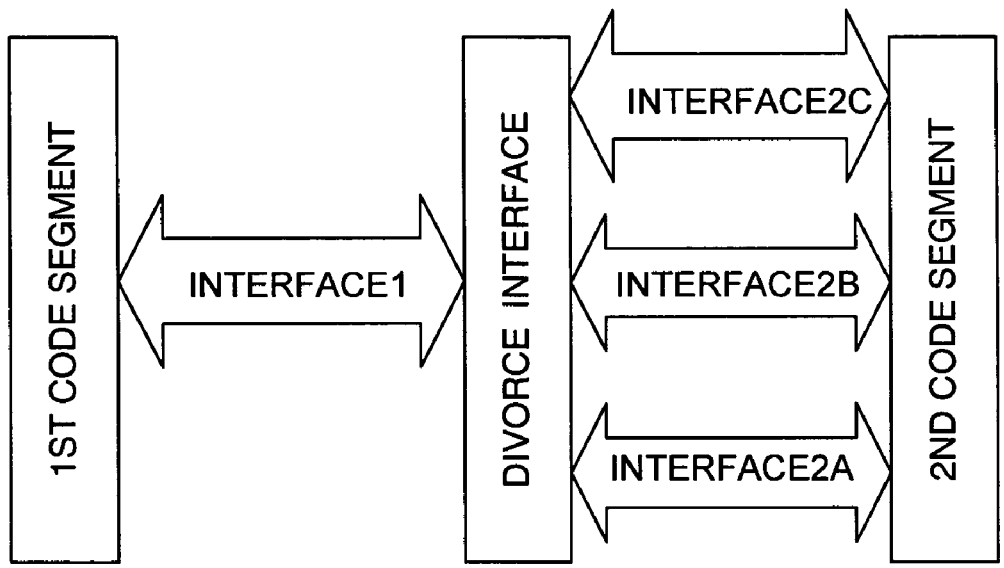

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
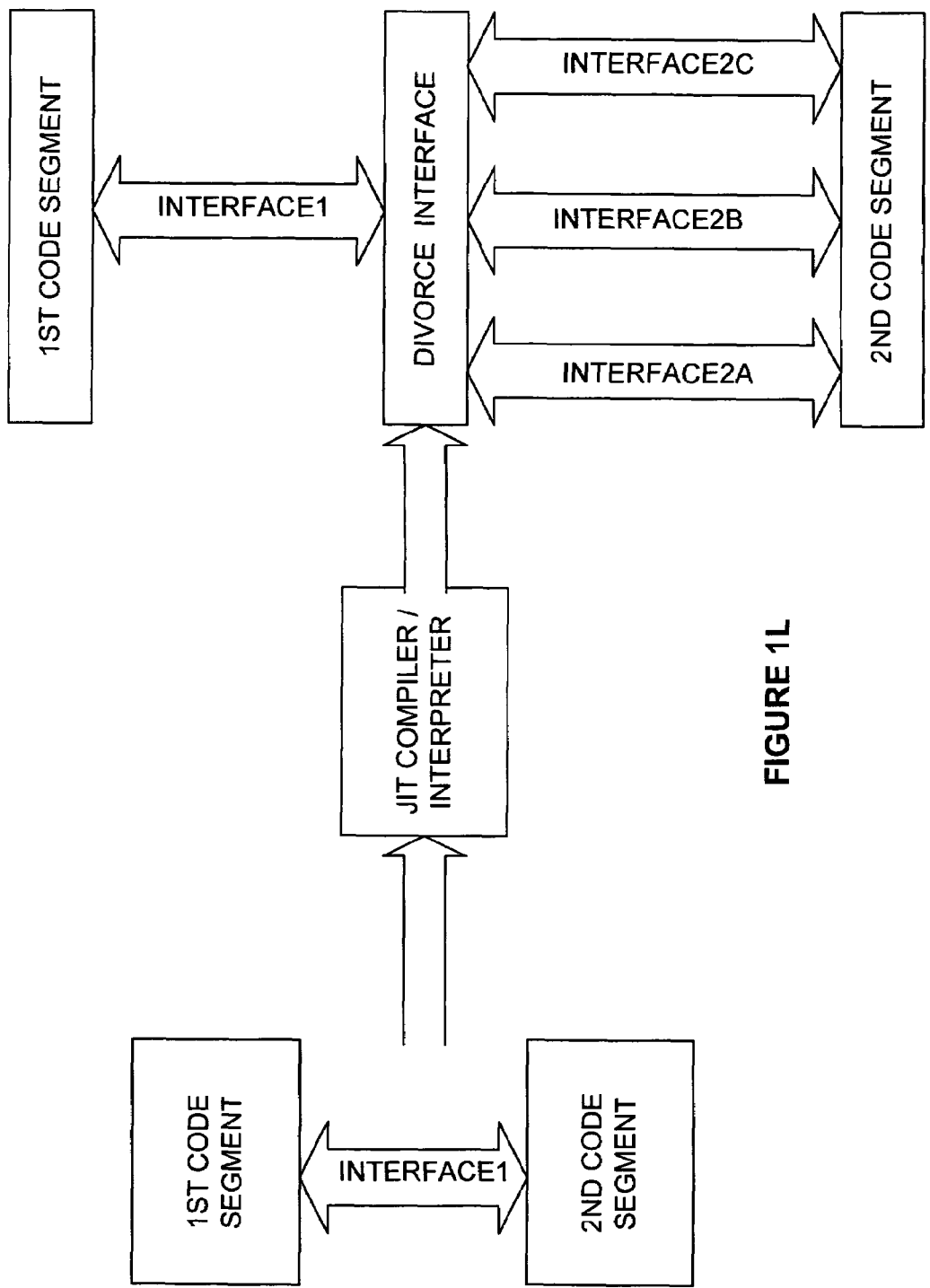

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touchsensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Pen Tip Associations

Figure 3:
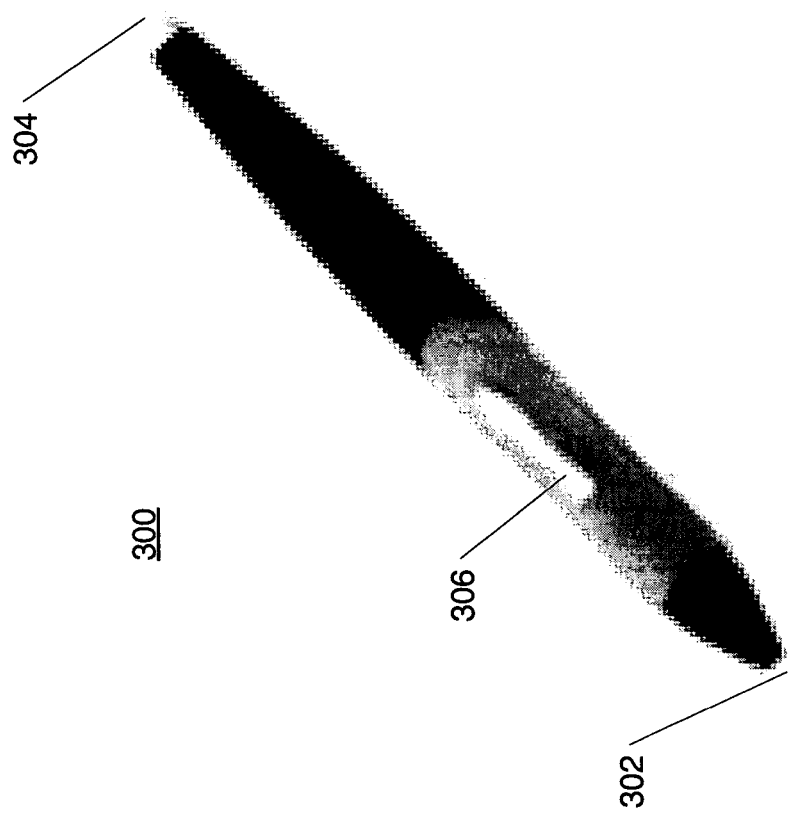
FIG. 3 illustrates a pen that may be used with embodiments of the present invention.

FIG. 3 illustrates an electronic pen 300 as one of a variety of input devices. The pen as shown in FIG. 3 has two pen tips: primary pen tip 302 and secondary pen tip 304. The pen 300 also has a button 306. A pen as shown in FIG. 3 may be available from Wacom Technology Corporation of Vancouver, Wash.

In other examples of the pen 300, it may only have one pen tip 302 and the button 306. In yet other examples, the pen 300 may have two or more pen tips and no buttons. Additional pen tips may include the ends of pen caps and other removable portions. It is appreciated that primary, secondary, and other designations for one pen tip over another is made purely for the purpose of explanation. All pen tips may be considered equal or have a hierarchy.

In a first example of a pen with multiple pen tips, each pen tip may have its own pen tip identification. This identification may become known to the computer system in a variety of ways. For example, the digitizer may be able to determine the pen tip ID. Also, the shape of the footprint created by the pen tip may help identify the pen tip. Other techniques for identifying the pen tip may be used as well.

In the example where the digitizer determines the pen tip ID, the pen tip ID may be determined when the pen tip is near the screen or when it is touching the screen. Where different pen tip IDs are used, the pen tip ID may be mapped to a language.

For example, a user may write in both English and French. The pen the user is using may have two tips, each with its own pen tip ID. The primary tip may be mapped to English and the secondary tip may be mapped to French. Using this arrangement, the user may flip the pen around when she wants to write in French then flip the pen around again when she wants to write in English.

The mapping may include one or more associations. For example, the mapping may associate a first handwriting recognizer with ink created with the first pen tip 302 and associate a second handwriting recognizer with ink created with the second pen tip 304. The recognizer may be word based or character based. A character-based recognizer provides the benefit of being simple to implement and requiring a small memory and processor footprint. A word-based recognizer provides the benefit of having higher recognition rates and may permit a natural language model to be applied to the recognized ink to suggest corrections and the like.

In some cases, it may be beneficial to show which language (and associated recognizer) is currently being associated with the created ink. In this case, an indication of the current language (or recognizer) may be displayed in a variety of helpful ways. First, the language associated with the recognizer may be displayed. Alternatively, each language (or recognizer) may be associated with a color or set of colors. Switching pen tips would switch to the color associated with the language or recognizer. Further, the color of the ink may be modified to reflect the language or recognizer associated with it. This way, the user may view a paragraph of ink and see what words, characters, symbols, drawings and the like are associated with which recognizer. Further, instead of color, sound may be used to alert the user to the use of one language or recognizer over the other.

Handwriting recognition capabilities may be used to recognize handwritten ink. The results from the recognition process may be hidden from the user, replace the handwritten ink on the display, or may be displayed in conjunction with the handwritten ink. In some cases, the results of the recognition engine may be stored in an ink object. In other cases, the result may be stored separate from the ink in, for example, a database or table and indexed to the handwritten ink. The recognition engine may run while the handwritten ink is deposited, when handwriting is completed, or some combination of both (for example, if there is a pause of 2 or more seconds).

Figure 4A:
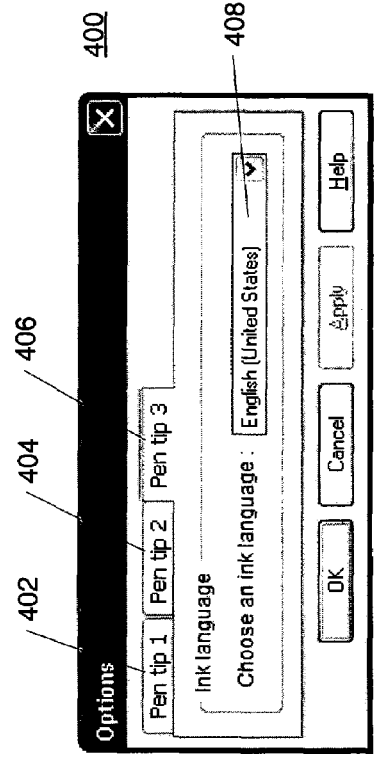
FIGS. 4A and 4B illustrate a first embodiment of a language palette and associated pens in accordance with embodiments of the present invention.
Figure 4B:
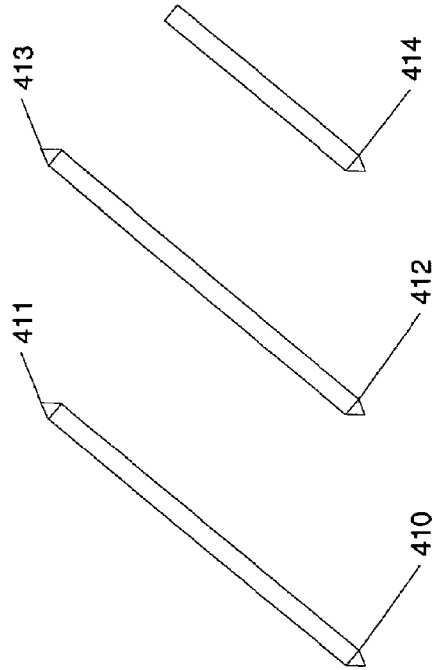

FIGS. 4A and 4B show a user interface for associating a pen tip with a language and various pens. For purposes herein, the user interface and the mechanism underlying it are referred to as a "language palette." The language palette provides the user with the ability to associate a pen tip ID (FIG. 4A) or state of the pen (FIG. 5A) with a language or handwriting recognizer.

Referring to FIG. 4A, a user can configure a different language for each pen tip ID, such that when the pen tip ID associated with the respective pen tip is sensed, the current input language changes accordingly. Using a language selection palette as shown in FIG. 4A, a user may select pen tip ID 402, pen tip ID 404, or pen tip ID 406 (as represented by tabs for example) and may associate a different language (or the same language) with each of the respective pen tip IDs. FIG. 4A shows one selection mechanism (here, a drop down menu 408) for associating the selected pen tip ID tab (here, 406) with a language from the language selection menu (e.g., drop down menu 408). It is appreciated that a drop down menu as shown as element 408 is for illustrative purposes only. Alternatively, one could use radio buttons, mouse or hover-over menus, and dialog boxes, directory navigation windows, and other selection techniques to associate the pen tip 406 with a language.

Further, one may have predefined languages as tabs (representing recognizers stored in or accessible by the system (e.g., stored remotely over a network)) and having the pen tip IDs in a selection system 408.

FIG. 4B shows various pens with pen tips (410-414). A user may have some or all of the pen tip IDs associated with the pen tips (410-414) mapped to one or more languages. So, one may have an English-Spanish pen, an English-French pen, and an English-Math pen. A math (or equation) pen may be used as well. For example, if one was using a math recognizer, a "Σ" may be recognized as a summation symbol and not a capital "E" and an "a" may be recognized as an "α."

Further, some pen tip IDs may not be associated with a language or recognizer. This may be a default setting or a non-recognition setting. So, for example, if one were attempting to draw a picture, the system would not attempt to associate the ink (ink object or strokes of the picture) with a recognizer (which may eventually attempt to recognize the ink, producing erroneous results).

The above ability to associate a pen tip ID with a non-traditional language property (math, graphical shapes, and the like), may be realized in a variety of ways. First, for example, a single non-language pen tip ID may be assigned and the interpretation of the pen tip ID is left to the software context (such as currency field of Excel or a music sheet of some sort of music composing assistance software, for instance). The interpretation of the pen tip may depend on the context. For example, if the pen tip ID is associated with a language, ink is recognized as text, otherwise, ink may be associated with an alternative identity (for example, musical notes in the music composing-assistance software or a geographical graphics element in a graphic or drawing software, or the like).

Second, an alternative approach is to enumerate all non-language properties (such as graphical shapes, currency number, musical notes) and then treat them equally in reference to the language property.

Further, in some embodiments, a recognizer may recognize a shape and map that shape based on the current language associated with an input device, such as the currently used pen tip. For example, a rectangular shape drawn while the language setting for the input device is U.S. English may result in the "the stars and stripes" flag being displayed, while the same rectangle drawn when the language setting for the input device is UK English may result in the Union Jack being displayed.

In other embodiments, a particular recognizer to be used is selected based on the language setting of the input device and a software context of the input. For example, when a number is written into a currency field of a spreadsheet when the language setting for the input device is U.S. English, the recognizer not only recognizes the ink as a number, but also may enter an appropriate currency sign, such as $, a thousand separator, and a decimal point. Using other examples, the input device or pen tip may have no language associated with it when being used in another software context, for example, with music composing aid software or a graphics software. Such input may be recognized as musical notes or graphics elements, respectively; however, if a language is associated with the input device, in this situation, the input may be recognized as text.

In some embodiments, the language setting of the input device may affect items already displayed. For example, when a software keyboard is displayed and an input device, such as a pen having a pen tip configured with an ID indicating French is within a predetermined distance of the display, the pen tip ID of the pen is detected and a French software keyboard may be displayed. When the pen, at a later time, is within a predetermined distance of the display, and the pen tip ID of the pen is detected to map to U.S. English, the displayed software keyboard may be changed to a U.S. English software keyboard. In this example, the language setting of the input device is not associated with ink. Rather, it is associated with changing the language associated with another information pathway.

Button Associations

Aspects of the present invention may be applied to both pen-based and non-pen based computing systems. For example, aspects of the present invention relate to associating a language or recognizer with a button click. As shown in FIGS. 3 and 5B, some pens may have one or more buttons (306, 516, and 517). Mice and trackballs have buttons as well. Aspects of the present invention permit one to map a button click to a language or recognizer. If one was writing with a pen and needed to change languages, he may click an action button on the pen and have the pen tip ID associated with the next recognizer. This may also be applied to mice and trackballs in that, when one is using the mouse as a handwriting input mechanism, clicking a mouse button may provide the same cycling through the languages or recognizers.

Some input devices, such as, for example, a computer mouse, a stylus, or an electronic pen having only one pen tip may also be used with embodiments of the invention. A predetermined list of languages may be configured by using a language palette such as a language palette 500, shown in FIG. 5A. In this embodiment, to configure a list of input languages, a user may select one of tabs 502, 504 or 506 and choose an input language from menu 508. While entering electronic ink input, a user may indicate a change of input language by various means. For example, if a computer mouse is used, depressing a button may be used to cause the next language to be selected. For example, a switch from a first language to a second language will occur. If a stylus is used, a button on the stylus may be used. Further, if no button on the stylus or pen, one may tap on a displayed button on the user interface that indicates the current or next language selection.

Illustrative language palette 500 shows that three clicks may be configured; however, other embodiments are possible in which fewer or more clicks may be configured. In a related embodiment, for use with a pen that has a single tip with one unchangeable pen tip ID or for use with an input device that includes, for example, a stylus or a pointing device with no electronic ID, the user may change the input language by using a language palette similar to that of FIG. 4A, but one that allows only one language to be configured. Thus, tabs 504 and 506 would not be displayed. In this embodiment, the user may change the input language by selecting the language palette and selecting another desired language by means of the pop-up menu. This approach of having a language palette readily available for a user provides the benefit of an easy user interface to navigate, as opposed to drilling down through a number of menu options to change the language associated with an input device.

Accordingly, using the pen of FIG. 5B, a user may have a number of languages associated with the pen. For example, the user may have a first language set dedicated to the first pen tip 512 with its associated pen tip ID and a second language set dedicated to the second pen tip 514 with its associated pen tip ID. If only one button 516 is used, the clicking of the button may cycle through the language sets for that pen tip ID. If two or more buttons are used (buttons 516 and 517, for example), the clicking of the different buttons may cycle through different sets of languages or recognizers. Further, both buttons may operated at the same time to click through even more languages or recognizers, or may be used to reset all click states back to a default or initial click state.

FIG. 5C shows a table listing clicks of one or more buttons with a language associated with a pen tip ID. The table includes clicks 518 and pen tip IDs 520, 521, and 522. If using a first pen tip with its first pen tip ID, the clicking may cycle through a first set of languages (for example, English, French, and German). If using a second pen tip with a second pen tip ID, the clicking may cycle through the same set of languages with the same or offset starting language. Alternatively, a different language set may be associated with the second pen tip ID. For example, clicking while using the second pen tip may cycle through Japanese, English, and Italian.

Instead of the clicking of a button, as described above, to change a language association with an input device, other techniques may be used. For example, a temporary language association change may be performed when a gesture is made with an electronic pen, such as making a circular motion with the pen while hovering above the display, or slanting the pen by an angle more than a predetermined number of degrees from the upright position. Of course, many other techniques may be used and the invention is not limited to only those techniques listed above.

Language Assistance

In some situations, it may be difficult for a user to remember what language was assigned to a pen tip or to a current click state of the pen (or mouse or trackball). As an option, the system may provide to a user a visual or audible indication of a current language or change in language. For example, FIG. 6 shows a process for modifying a user interface to reflect a language or recognizer being associated with received ink. In step 600, the system checks to see if a pen tip is at least near the display screen (near or touching). If there is a pen tip near or touching the display screen, then the system steps to step 601. Otherwise, the system checks later or waits until an event is received that indicates a pen tip is near or touching the display screen. Next, in step 601, the system determines if a language identification (language ID) is associated with the pen tip. The pen tip may include a pen tip ID or may not. If yes, then the user interface may be modified in step 602 to accommodate the language associated with the pen tip from step 601. This step 602 reflects to a user that the ink being captured will be associated with a language or recognizer. Otherwise, in step 603, the user will be shown a default interface and the ink will be associated with a default language. The checking of step 600 may be event driven. That is, an event may be generated each time the pen tip is near or touching the display screen. Alternatively, the checking of step 600 may be performed every predetermined time period, i.e. in a polling manner.

Illustrative Processes

FIG. 7 shows a more detailed process for associating received ink with a language. In step 701, ink is received along with a pen tip ID. In step 702, the system determines the language ID associated with a pen tip ID. In step 703, the received ink is associated with the language ID from step 702. This may be the end of the association process of FIG. 7. Alternatively, as shown in broken lines, a recognizer associated with the language ID may process the received ink as shown in step 704.

FIG. 8 shows, in block diagram form, an illustrative apparatus for implementing aspects of the invention. The input receiver of 801, which may be, for example, a digitizer, such as digitizer 165 for receiving strokes of electronic ink. With regard to this specification, language not only refers to written languages, including but not limited to, for example, English and Japanese, but may also refer to special symbols, such as mathematical symbols used to express mathematical formulas.

Language palette 804 maps the input strokes to a particular language (language ID) or recognizer. That is, strokes input from a pen having a pen tip ID that is mapped to a particular language ID are mapped to the language ID by language palette 804. The input strokes and the language indicator (or identification of the recognizer) may be stored in storage device 802, which may include, but not be limited to computer memory, such as Random Access Memory (RAM), optical disk, floppy disk, and hard disk.

Language palette 804 provides an indication to assister 508 to inform assister 508 of the current input language. Assister 508 (optional aspect as shown in broken lines) may cause a visual indication to appear on the display 805 so as to provide an indication of the current input language. Further, assister 803 may alternatively (or additionally) cause an audio indication to be heard, which provides an indication of the current input language.

Language palette 804, recognizers 806 and 807 and optional assister 803 may be implemented as program modules residing in RAM 150 and executed by processing unit 110. Further, the storage device 802 may include, but not be limited to RAM 150, hard disk 170 or magnetic disk 190.

Figure 10A:
FIGS. 10A, 10B, and 10C show examples of a visual indication of a language or recognizer to be associated with handwritten ink in accordance with embodiments of the present invention.
Figure 10B:
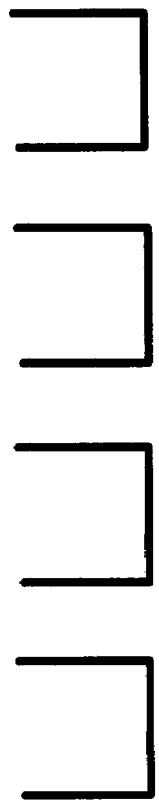
Figure 10C:
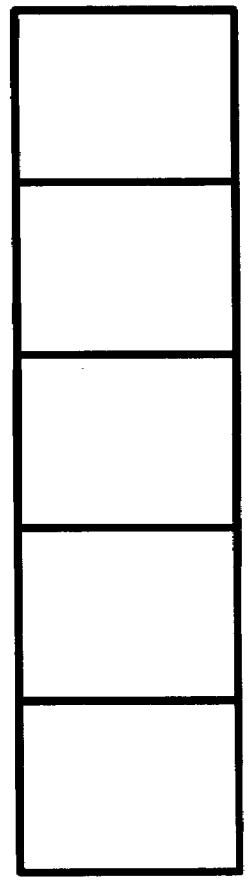

The visual indication, which may be provided by assister 803, may be presented in a number of ways, including, but not limited to displaying a textual message, such as a name of the current input language, displaying electronic ink in a particular color (with the color providing an indication of the current input language—e.g., red for English and blue for Japanese), indicating the current input language by the background color, and indicating the current input language by a thickness of entered strokes of the electronic ink (for instance, thick strokes indicating English and thin strokes indicating Japanese). FIGS. 10A, 10B, and 10C provide additional examples of a visual indication of the language to be associated with received ink. For instance, a straight horizontal line may indicate that the language to be associated with received ink is a character-based language (e.g., English), while a three-quarter box from FIG. 10B or a boxed input region FIG. 10C may indicate that the language to be associated with the ink is a symbolic language (e.g., Japanese). Display 805 may be used to display the visual indication and may be used to display the strokes electronic ink as they are entered.

The audio indication, which may be provided by assister 803, may be presented as, for example, particular tones, such as a high tone for English and a low tone for Japanese. Further, a tune may be played as an indication. For example, the national anthem of a particular country may be played, such as the national anthem of the United States to indicate English and the national anthem of Japan to indicate Japanese. The audio indication may be played through a speaker, as is well-known in the art.

Storage device 802 stores input strokes of electronic ink along with a language or recognizer identification.

The system may have a plurality of handwriting recognizers, for example, one for each language. In the system shown in FIG. 8, a first recognizer 806 and a second recognizer 807 are illustrated, although the system may have more than two recognizers.

FIG. 9 illustrates an optional process that may be used when modifying the language or recognizer associated with the pen (with or without a pen tip ID) or other input device. At 901, a check is performed to determine whether a new language has been selected. As mentioned earlier, if the input device is a stylus, the user may move a pen with identification of the pen tip or, alternatively, may press or select a next language box to select a next language from a predefined list of languages. Further, the user may configure input for another language by using the language palettes described in relation to FIGS. 4A and 5A. For example, if the input device is a computer mouse, a button of the mouse may be depressed to cause the next language from the predefined list of languages to be selected. If a new language was selected, the strokes of electronic ink may be captured at step 902 with a new interface to fit the new language or recognizer. Otherwise, at step 903, the strokes of electronic ink are captured with the current interface.

User Interfaces

Figure 11:
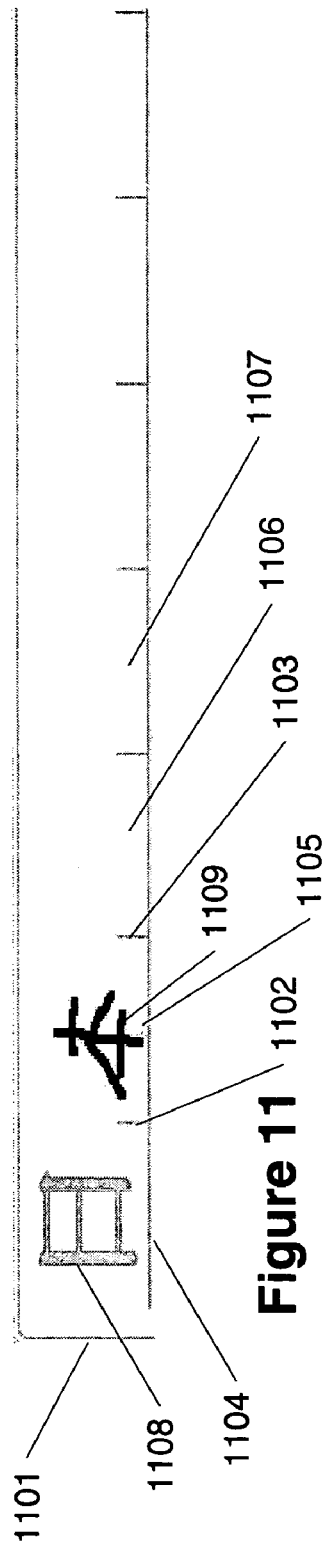

FIG. 11 shows a user interface 1101 in accordance with aspects of the present invention. Region 1101 may be referred to as a boxed or segmented input region. Visual clues 1102, 1103, and the like may be provided to a user to show where boxes or interface segmentations are divided. These box outlines or segmentation points define regions 1104, 1105, 1106, and 1107 and the like in which to write ink.

One of the benefits of using a boxed input is that recognition may occur shortly after (or immediately after) a user starts entering information in another segmented or boxed region. For symbolic languages (e.g., Chinese), recognition may start as soon as a user starts entering another character or symbol in another box or input region.

Referring to FIG. 11, symbolic characters are being written in region 1101. The user is now writing character 1109 in region 1105. The user has previously written character 1108 in region 1104. Recognition of character 1108 may occur based on one or a number of factors including writing in another region, moving a pen tip away from a surface, waiting for a predetermined time after the last ink stroke was entered in character 1108, and the like.

Figure 12:
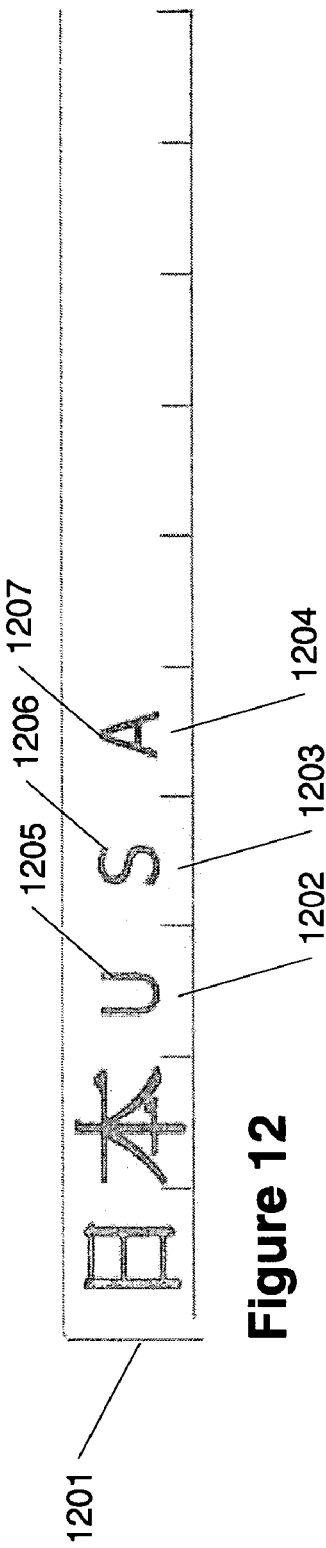

FIG. 12 shows input region 1201 having boxed or segmented input regions as shown in FIG. 11 and including regions 1202, 1203, and 1204. In each of these regions, a user has written characters 1205, 1206, and 1207, respectively. Characters 1205-1207 are the letters U, S, and A, respectively. Printing each character alone as shown in FIG. 1201 provides good recognition results. However, printing each character within its own region 1202-1204 is troublesome and slow for non-symbolic languages as it generally takes multiple letters to define a word or concept.

Figure 13:
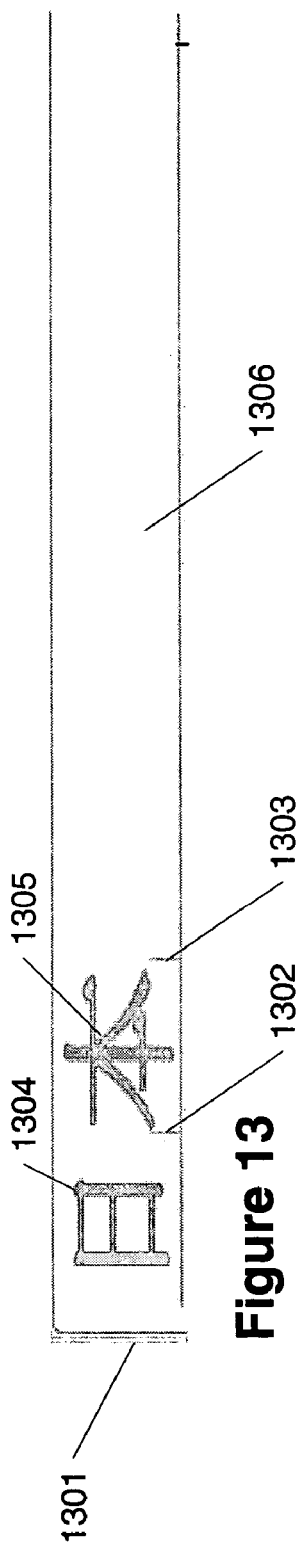

FIG. 13 shows a combination of boxed or segmented input and non-segmented or non-boxed input regions. The segmented or box regions are show by dividers 1302 and 1303. Here, a user may have written Chinese characters 1304 and 1305 then switched the user interface to accept a string of characters in region 1306.

Figure 14:
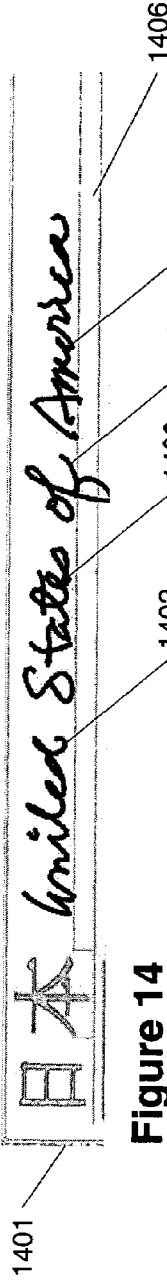

FIG. 14 shows handwritten script having been entered in region 1401. Here, the script is "United" 1402, "States" 1403, "of" 1404, and "America" 1405. The area in which they have been entered is region 1406. Recognition of the script in region 1406 may be delayed until a predetermined time after all words have been completed, until at least one word has been completed, some combination thereof, or writing someplace else. Other determining factors when to start recognition are possible.

Figure 15:
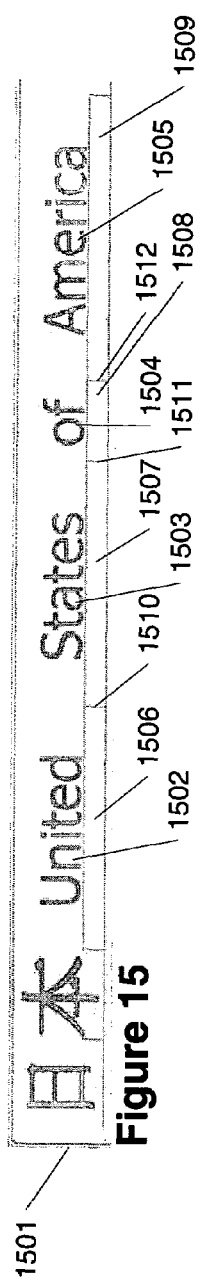

FIG. 15 shows region 1501 with the handwritten script having been recognized. The script has now been converted into text 1502-1505. The text may be displayed in place of script or juxtaposed to it. In FIG. 15, the script has been replaced with the text. Next to each recognized word is a region 1506-1509 divided by segmentation dividers 1510-1512. The regions 1506-1509 may or not be used to help show to a user that the text has been recognized. Alternatively, the regions 1506-1509 may be used to provide the user with a horizontal line to help guide the writing of script 1402-1405.

Figure 16:
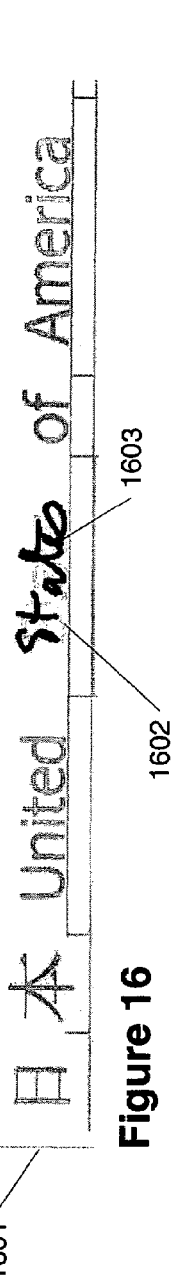
FIGS. 16-18 show various correction interfaces in accordance with aspects of the present invention.
Figure 17:
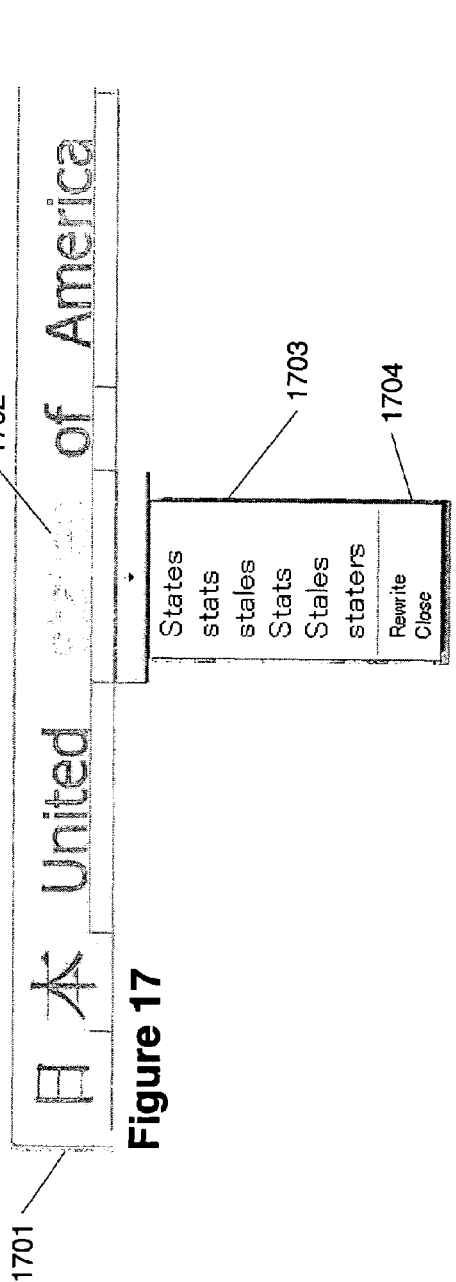
Figure 18:
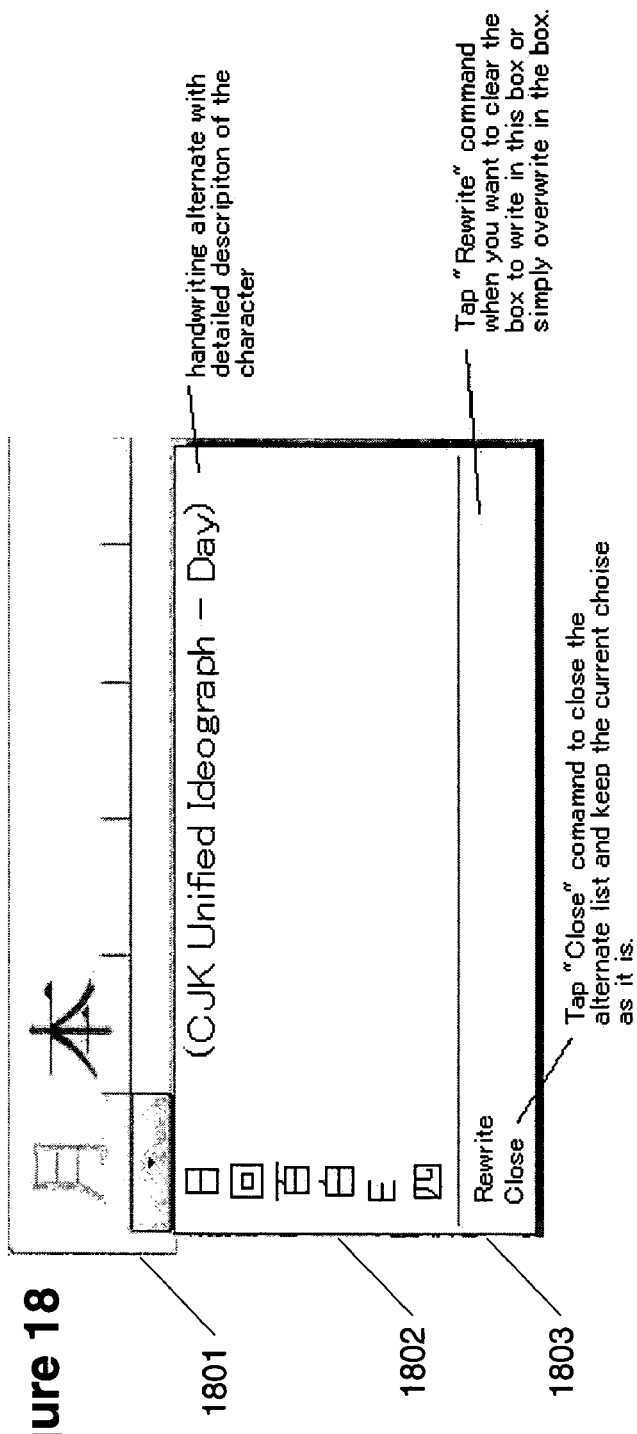

FIGS. 16-18 show optional correction mechanisms that may be used to correct recognized information. Referring to FIG. 16, For region 1601 having region 1602 with word 1603 in it, one may simply rewrite the word over an existing word with better penmanship to attempt to improve the recognition result of the processor. Alternatively, one may erase the word then rewrite the word 1603. Further, one may completely overwrite the original script (which may be shown ghosted) to provide the user with an indication of what the previous word looked like.

FIG. 17 includes region 1701. Here, a user is attempting to correct text 1702. On tapping on the text 1702 or otherwise selecting it (by tapping around it or tapping another button), a list of recognition alternatives may be displayed in region 1703. Region 1704 may be further provided to allow switching to the rewriting mode of FIG. 16 "rewrite" and may provide a close recognition results option.

FIG. 18 shows correction of characters entered in a boxed input form. Region 1801 includes additional regions. By tapping on one of the Chinese characters, one may be provided with a list of alternative text 1802 and option windows 1803.

Figure 19:
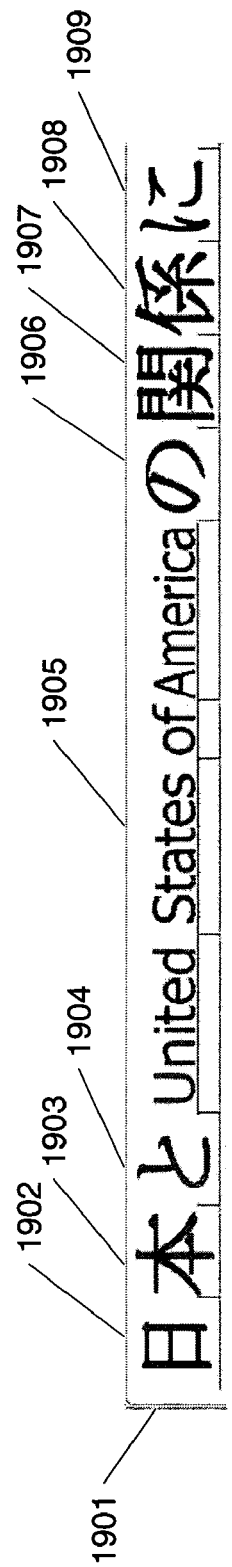

FIG. 19 shows input region 1901 that includes both symbolic characters and non-symbolic characters. The symbolic characters 1902-1904 and 1907-1909 are separated by English text 1905. This provides the benefit of allowing a user to switch recognition modes to associate the recognizer script or characters to follow.

FIG. 20 shows an alternative approach of entering information. Here, a user placed each letter of "United States . . . " in a separate region in FIG. 2001.

FIG. 21 shows yet another approach in which a user has entered an entire line of script.

FIG. 22 shows yet another approach in which both symbolic and non-symbolic characters have been written on the same line.

User Interface Selection Processes

Figure 23:
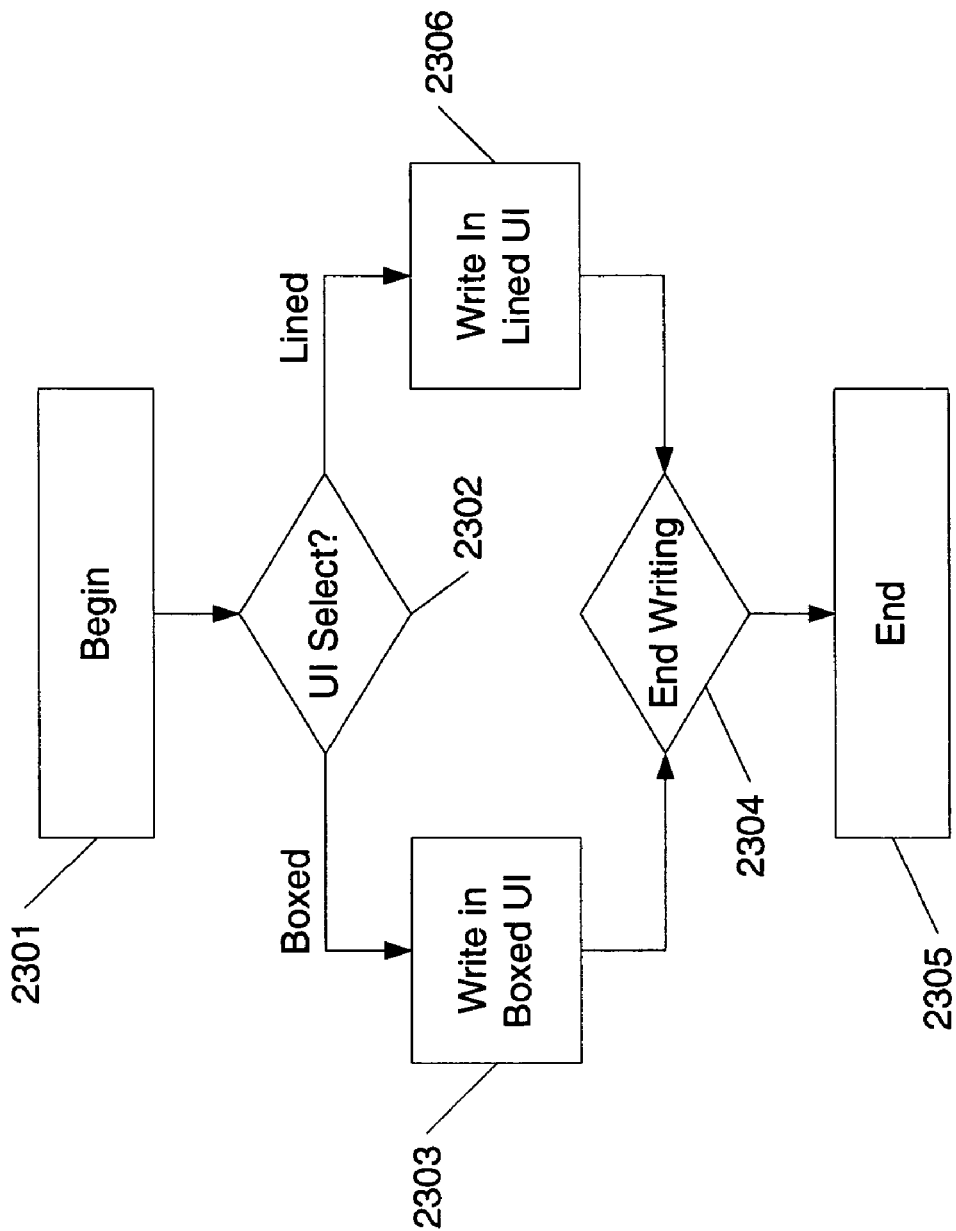
FIGS. 23-25 show processes for selecting and entering handwritten ink in accordance with aspects of the present invention.
Figure 24:
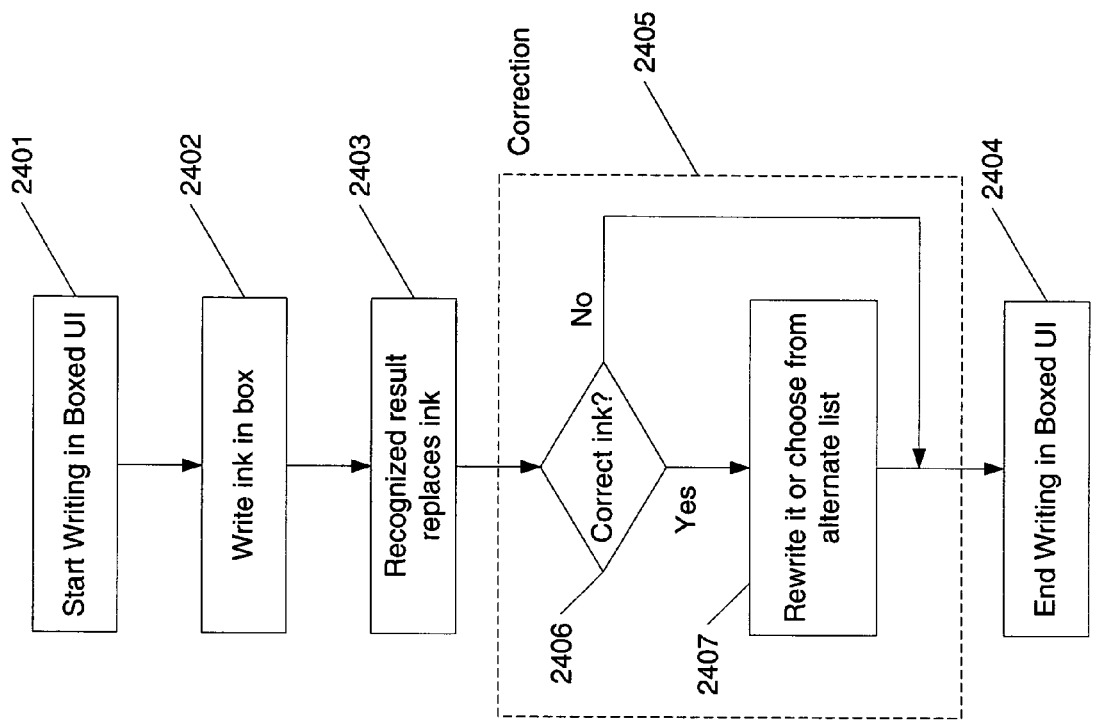
Figure 25:
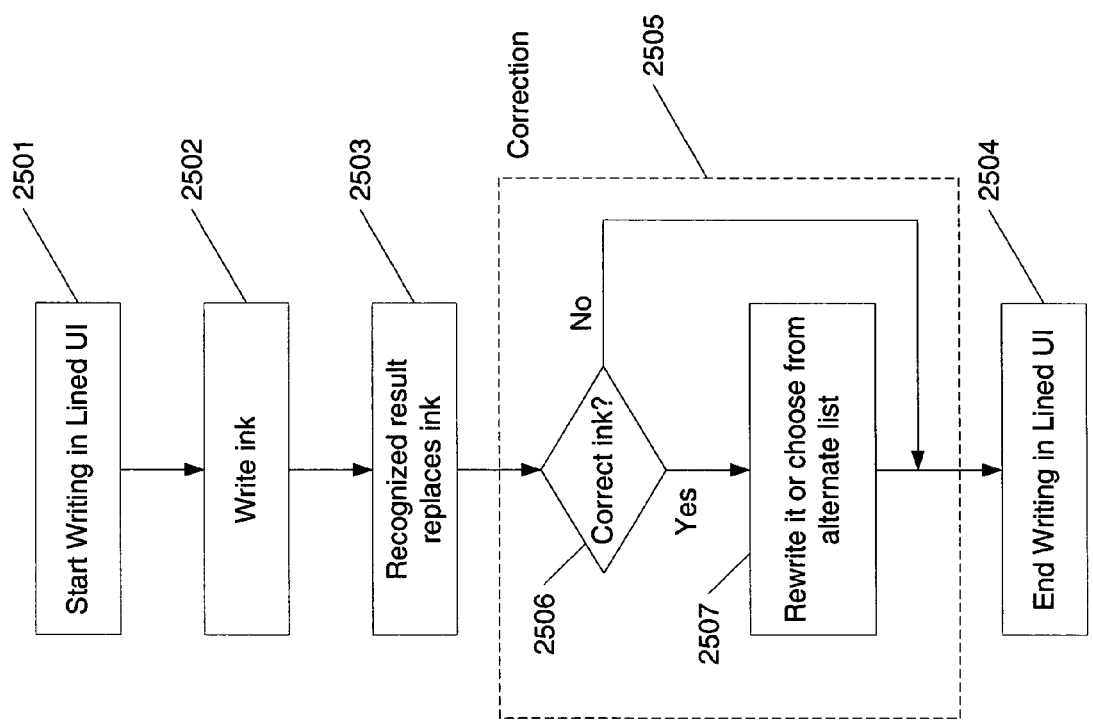

FIGS. 23-25 show illustrative processes for determining which user interface to show to a user so that the user may accurately select which user interface to user for ink to be written. In step 2301, the process begins. In step 2302, the system determines if a user has made a choice of which user interface to use. If the user has selected a boxed input, then a boxed input is shown and the user writes in the boxed input user interface in step 2303. The system stays in this mode until the user has completed writing in step 2304, at which point the writing system ends in step 2305. If lined input has been selected in step 2302, the system then provides a lined input for the user and receives input from the user in a lined user interface in step 2306. On the conclusion of writing in step 2304, the system stops looking for user ink and ends in step 2305.

FIG. 24 shows a process of step 2303. In step 2401, the user is displayed the boxed user interface. In step 2402, the user may write ink in the boxed region. In step 2403, the system attempts to recognize the handwritten ink. The system may or may not replace the ink with recognized text. Then the system ends in step 2404.

In one alternative aspect, the system may continue with correction step 2405. Here, the user is provided with the option of correcting ink written in step 2402. If the user desires to correct the ink in step 2406, then the user is allowed to rewrite the ink or choose it from an alternative list in step 2407. Finally, the system ends in step 2404. If no from step 2406, the system may return in step 2404.

FIG. 25 shows a process when a user selected a lined user interface in step 2306. In step 2501, a user is displayed a lined user interface for receiving ink. The lined user interface may include one or more guide lines for receiving ink. Alternatively, the lined input may have no lines. Next, in step 2502, a user may write ink in the displayed region with the lined input. In step 2503, the system attempts to recognize the handwritten ink. The system may or may not replace the ink with recognized text. Then the system ends in step 2504.

In another alternative aspect, the system may continue with correction step 2505. Here, the user is provided with the option of correcting ink written in step 2502. If the user desires to correct the ink in step 2506, then the user is allowed to rewrite the ink or choose it from an alternative list in step 2507. Finally, the system ends in step 2504. If no from step 2506, the system may return in step 2504.

The user interfaces shown in FIGS. 11-22 relate to simple user interface distinctions. As previously described, a specific recognizer may be associated with handwritten ink. Which recognizer is currently selected may be provided to a user in addition to the lined or boxed input mode.

The actual display of the selected recognizer may be further modified by which recognizers are installed or available. For instance, if only a Japanese recognizer is installed in a system for symbolic input and both French and German recognizers are installed for linear input, then, when in symbolic user interface mode, no indication of the Japanese recognizer may be provided as there is only available recognizer that relates to symbolic language.

The boxed input mode may be associated with one or more types of recognizers and each recognizer may support boxed input and/or lined input. For example, the boxed input mode may be associated with a symbolic (or sometimes referred to as East Asian) language. Also, the boxed input mode may be associated with an alphanumeric input as well (to recognize printed characters). Further, the boxed input may be associated with math or digit-type recognizers. The line input mode may be associated with written words (or a recognizer that looks for written words). Alternatively, the line input mode may be a generic input mode and may wait for custom selection (or previous selection) of a recognizer to be associated with it.

Further, the boxed input mode and/or the lined input mode may be associated with zero recognizers. For instance, the user may make no overt association of a language with a recognizer. However, the system may be able to determine a recognizer (from reviewing installed recognizers) or use as default a recognizer in association with a language.

Figure 26:
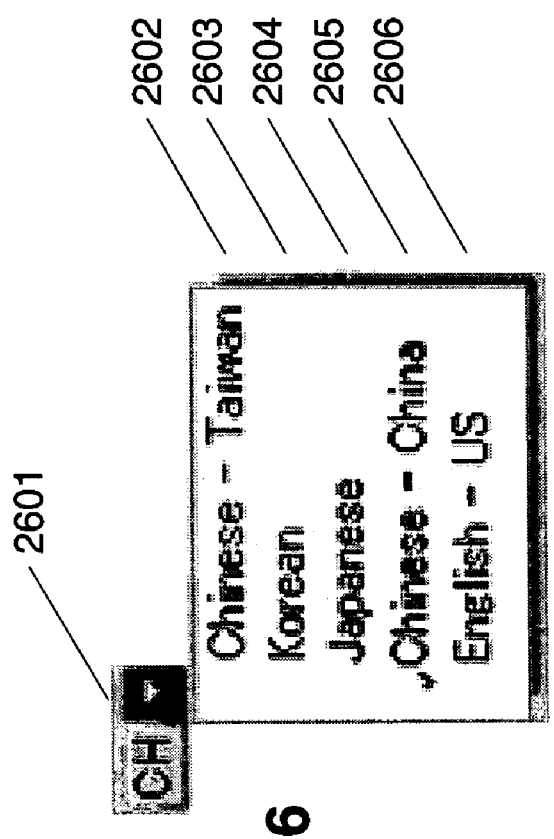
FIG. 26 shows an illustrative user interface for selecting a language in accordance with aspects of the present invention.

The number of recognizers that may be associated with a language may vary. In a general sense, there may be a one-to-one identity between a language and a recognizer. Alternatively, a user may select from a variety of recognizers to be associated with a language. For instance, FIG. 26 shows a user interface for selecting an active language. Here, for instance, one may select button 2601 and be shown a variety of different languages. The different languages include Chinese-Taiwan 2602, Korean 2603, Japanese 2604, Chinese—China 2605, and English—US 2606. These available languages may relate to the different display languages resident in a system. Some of these display languages may or may not have actual recognizers for that specific language. For instance, there may be no Mandarin China recognizer available, but only a Simplified Chinese recognizer available. Thus, upon the selection of Chinese-Taiwan 2602 and Chinese-China 2606, the actual recognizer that may be associated is the Simplified Chinese recognizer. FIG. 26 is provided for illustrative purposes only. It is appreciated that other incarnations of a language switching interface are possible. Also, a user may select a recognizer for each input mode for a language. So, one may select Simplified Chinese for a boxed input mode and English for a lined input mode (or Simplified—Chinese or any other single or combination of recognizers as desired by a user).

A decision table may be present for determining which recognizer may be associated with a language selection and what type of input mode is supported.

| Language | Recognizer | Boxed Input? | Lined Input? |
|---|---|---|---|
| Arabic | None | | |
| French | Company A | No | Yes |
| Simplified Chinese | Company A | Yes | Yes |
| Japanese | Company A | Yes | Yes |
| Japanese | Company B | Yes | No |

From the above table, some languages may have no recognizers associated with them. Some languages have exactly one recognizer associated with them. Some languages may have more than one recognizer associated with them. Some recognizers support both boxed and lined input modes, some only support one input mode.

It is further recognized that a user may specify a language to which no recognizer is currently installed on a local machine. In this situation, recognition may be performed when a recognizer becomes available for the entered information. For instance, the recognizer may be stored at a remote location and accessible over a network (for example, an intranet, and extranet or the internet).

Figure 27:
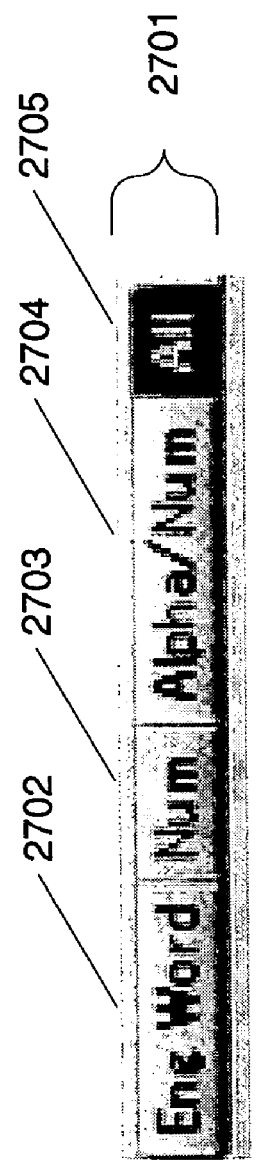
FIG. 27 shows an illustrative language switching user interface in accordance with aspects of the present invention.

One may switch between the various modes through the processes described in relation to FIGS. 3-9. For instance, one may cycle through various mappings identifiers to modify which recognizer or which user interface mode is to be used. FIG. 27 shows an illustrative example of an input mode switching user interface 2701. In this example, the user interface may take the form of a bar 2702. Various mappings between languages, recognizers, and boxed/lined input modes may exist in bar 2701. Here, the bar 2701 is shows the current mode being a boxed input (option 2705 having been selected). A first option 2702 may be provided to a user that allows switching to a lined input mode. The lined input mode may be associated with the current or another recognizer. In this example, the English recognizer is associated with the lined input mode and the user interface provides an indication of the identity of the recognizer. In an alternate approach, option 2702 may only be entitled "Word" so as to indicate a lined input mode that accepts a written word. Number 2703 and Alphanumeric/Number 2704 options may relate to an East Asian recognizer or English recognizer as both may support these types of inputs. The specific recognizer associated with the "word" 2702, "Number" 2703, "Alphanumeric" 2703, and "all" 2704 may or may not be configurable by a user.

Further, various mappings may exist for various pens or selectable buttons (hardware, software, and the like) that allow a user to change which input mode he wants to use.

Aspects of the present invention have been described in terms of various illustrative embodiments. Numerous other embodiments, modifications and variations within the scope and spirit of the appended claims will occur to persons of ordinary skill in the art from a review of this disclosure.

We claim:

1. A process performed in a stylus-based computer system for receiving handwritten information input by a user via a stylus and an input screen, the process comprising:
inputting handwritten information by the user on a first portion of the input screen using a first pen tip of the stylus, the handwritten information on the first portion of the input screen to be recognized according to a first mode of recognizing handwritten input;
detecting at least one of:
the user switching from the first pen tip of the stylus to a second pen tip for inputting handwritten information, the second pen tip being associated with a second mode of recognizing handwritten input; and
the user inputting an instruction to switch from the first mode of recognizing handwritten information to the second mode;
in response to the detecting, switching the input screen from a first input mode associated with the first mode of recognizing handwritten input to second input mode to provide a second portion of the input screen associated with the second mode of recognizing handwritten input, such that the first and second portions of the input screen are concurrently configured according to different input modes; and
inputting handwritten information by the user on the second portion of the input screen using the stylus, the handwritten information on the second portion to be recognized according to the second mode of recognizing handwritten input,
wherein one of the first and second modes of recognizing handwritten input corresponds to character-based recognition, and the other of the first and second modes of recognizing handwritten input corresponds to word-based recognition, and
one of the first and second portions is configured according to boxed input mode and the other of the first and second portions of the input screen is configured according to line input mode.

2. The process according to claim 1, further comprising:
performing character-based recognition on the handwritten information inputted on the portion of the input screen configured in accordance with the boxed input mode; and
performing word-based recognition on the handwritten information inputted on the portion of the input screen configured in accordance with the lined input mode.

3. The process according to claim 2, wherein said inputting the handwritten information in said first portion of the input screen is performed at least in part via a correction user interface.

4. The process according to claim 2, wherein inputting the handwritten information in said second portion of the input screen is performed at least in part via a correction user interface.

5. The process according to claim 1, further comprising: receiving user selection of a language and associated input mode to be mapped to each of the first and second pen tips of the stylus.

6. The process according to claim 1, wherein said detecting step includes receiving a user selection of a language and associated input mode to be mapped to the second portion of the input screen.

7. The process according to claim 1,
wherein a first language is associated with the first mode of recognizing handwritten input,
wherein a second language is associated with the second mode of recognizing handwritten input,
the process further comprising:
performing recognition on the handwritten information inputted on the first portion of the input screen based on the first language; and
performing recognition on the handwritten information inputted on the second portion of the input screen based on the second language.

8. A stylus-based computer system comprising:
a user interface including a stylus and an input screen for receiving handwritten information from a user, wherein handwritten information is input by the user on a first portion of the input screen using a first pen tip of the stylus, and the handwritten information on the first portion of the input screen is to be recognized according to a first mode of recognizing handwritten input; and
a processor configured to:
detect at least one of:
the user switching from the first pen tip of the stylus to a second pen tip for inputting handwritten information, the second pen tip being associated with a second mode of recognizing handwritten input; and
the user inputting an instruction to switch from the first mode of recognizing handwritten information to the second mode;
in response to the detection, switch the input screen from a first input mode associated with the first mode of recognizing handwritten input to a second input mode associated with the second mode of recognizing handwritten input in order to provide a second portion of the input screen configured according to the second input mode, such that the first and second portions of the input screen are concurrently configured according to different input modes, wherein handwritten information is input by the user on the second portion of the input screen using the stylus, and the handwritten information on the second portion is to be recognized according to the second mode of recognizing handwritten input, wherein one of the first and second modes of recognizing handwritten input corresponds to character-based recognition, and the other of the first and second modes of recognizing handwritten input corresponds to word-based recognition, and one of the first and second portions is configured according to boxed input mode and the other of the first and second portions of the input screen is configured according to line input mode.

9. The system according to claim 8, said processor being configured to display a correction user interface in association with at least one of the first and second portions of the input screen.

10. The system according to claim 9, said processor responsive to user input to operate said correction user interface for said boxed input mode.

11. The system according to claim 9, said processor responsive to user input to operate said correction user interface for said lined input mode.

12. The stylus-based computer system of claim 8, wherein the processor is further configured to:

receive the handwritten information inputted through the user interface on the first portion of the display screen as a first handwritten ink;

perform recognition of the first handwritten ink in accordance with the first mode of recognizing handwritten input;

receive the handwritten information inputted through the user interface on the second portion of the input screen as a second handwritten ink; and perform recognition of the second handwritten ink in accordance with the second mode of recognizing input.

13. The stylus-based computer system of claim 8, wherein a first language is associated with the first mode of recognizing handwritten input, wherein a second language is associated with the second mode of recognizing handwritten input, and wherein the processor is further configured to:

perform recognition on the handwritten inputted on the first portion of the input screen based on the first language; and perform recognition on the handwritten information inputted on the second portion of the input screen based on the second language.

* * * * *

UNITED STATES PATENT AND TRADEMARK OFFICE
CERTIFICATE OF CORRECTION

| | | |
|---|---|---|
| PATENT NO. | : 7,424,154 B2 | Page 1 of 1 |
| APPLICATION NO. | : 10/704121 | |
| DATED | : September 9, 2008 | |
| INVENTOR(S) | : Seto et al. | |

It is certified that error appears in the above-identified patent and that said Letters Patent is hereby corrected as shown below:

In column 19, line 57, in Claim 1, before "second" insert -- a --.

Signed and Sealed this
Third Day of May, 2011

David J. Kappos
*Director of the United States Patent and Trademark Office*